Patented Dec. 25, 1934

1,985,792

UNITED STATES PATENT OFFICE 1,985,792

CATALYST

Hans Meerwein, Marburg, Fritz Ulffers and Rudolf Erbe, Eberswalde, and Franz Aichner and Wolfgang Klaphake, Berlin, Germany, assignors to Schering-Kahlbaum A. G., Berlin, Germany No Drawing. Application July 2, 1932, Serial No. 620,722. In Germany July 8, 1931

26 Claims. (Cl. 23—237)

The present invention relates to the preparation of catalytically active substances and more especially catalysts adapted for use in the conversion of terpenes, such as disclosed in an application for patent of the United States, Serial No. 527,846, filed April 4, 1931, by Fritz Ulffers and Rudolf Erbe.

According to this disclosure certain terpenes can be converted into other terpenes, for instance nopinene into pinene, or nopinene and pinene into camphene, if the starting product is acted upon with less than the equivalent quantity of an inorganic acid or an inorganic or mixed complex acid, or acid salt, which combine with terpenes, if at all, only reluctantly. This reaction is catalytically activated by the following acids or acid salts, including their polymers and hydrates.

1. Inorganic acids, such as titanic acids, silicic acids, vanadic acids, arsenic acids, molybdenic acids, antimonic acids and tungstic acids.

2. Complex acids, such as the boro-tungstic acids, silico-tungstic acids, silico-vanadic acids, boro-phosphoric acids, phosphoro-molybdenic acids, arseno-molybdenic acids, boro-acetic acids, alumino-oxalic acids and chromo-oxalic acids.

3. Acid salts, such as for instance the acid salts of phosphoro-tungstic acids, acid magnesium phosphates, acid mangano phosphates, acid urano phosphates and acid ammonium salts of phosphoro-molybdenic acids.

The catalytic power of these acids varies greatly depending upon their origin.

We have now found that highly efficient catalysts of uniform action can be obtained if these substances are subjected to a preliminary treatment which consists in acting thereon with bases to form the salts to set the acids free again from these salts and converting the products thus obtained into the hydrates having the highest catalytic efficiency.

This can be effected in various manners.

It is for instance possible to simply dissolve the acids in solutions of bases and, after filtration of the solution, to precipitate the acids or the acid salts by introducing these solutions at higher or lower temperatures into acids, the salts thus obtained being then rinsed and dried, either by heating under atmospheric or reduced pressure, if desired, in a current of an inert gas or of superheated steam.

It has been found that the highest catalytic efficiency is obtained if a predetermined degree of dryness is obtained, which is specific for each compound in question. If this degree of dryness is overstepped, the catalytic efficiency drops again. It is thus possible to prepare catalysts of a predetermined efficiency for each individual case.

The efficiency of the various catalysts is shown simply by the rise in temperature which occurs if 10–20% of the catalyst is introduced into hot pinene. More especially if the catalyst shall be used for converting pinene into camphene, its efficiency can also be ascertained by ascertaining in predetermined intervals the point of solidification of the pinene treated with the catalyst.

The catalysts can also be prepared by converting the starting substances or the anhydrids into the neutral acid or basic salts of volatile bases and expelling these bases by applying heat. During expulsion steam, which may be superheated, can be conducted in contact with the salts.

By heating with water, if desired under increased pressure, and if necessary in the presence of small quantities of bases or acids, the efficiency of these catalysts can be increased further.

Instead of converting the acids or the anhydrids into the salts, one may also start from the corresponding salts direct.

It has further been found that particularly efficient catalysts are obtained, if the removal of the base from the neutral or acid salts of the acids with volatile or non-volatile bases is only an imperfect one. This can be obtained either by treating the salts, either in the cold or at an elevated temperature, with a quantity of acid, which does not suffice for the complete removal of the base, or in the case of salts of volatile bases, by expelling these bases only incompletely. The base still remaining in the catalyst need not be present in stoichiometric proportion. A tungstic acid containing as little as 1–1.5% ammonia in linked form has been found to be a good catalyst. A tungstic acid prepared from sodium tungstate and containing 0.3% sodium is highly active. By varying the percentage of linked base in the acid the catalytic efficiency can be varied within wide limits to suit the particular exigencies of each individual case.

If the starting material, such as tungstic acid, is liable to be influenced by light rays, it is preferable to operate under seclusion from light.

As regards tungstic acid, it has further been found that a good catalyst for the conversion of terpenes can be obtained, if the acid or tungsten trioxide, instead of being dissolved in a watery ammonia solution, is exposed some days to a moist ammonia atmosphere, being during this time turned over with a shovel repeatedly, until no further reduction of weight is traced, whereupon the ammonium tungstate thus formed, which is readily soluble in cold water, is freed from the ammonia as described above.

The tungstic acid thus obtained is far more voluminous than the modifications hitherto known of tungstic acid. The volume of 10 grams of the new acid is about 6 ccms, while 10 grams of a tungstic acid catalyst prepared from ordinary ammonium tungstate by splitting off ammonia with the aid of superheated steam has only a volume of about 3.5 ccms. In proportion to its larger surface the tungstic acid obtained in accordance with this invention is highly efficient in converting terpenes by catalytic action.

The methods here described for increasing the activity of these catalysts are equally well suited for the regeneration of exhausted catalysts, which are preferably freed, for instance by calcining, from the organic matter adhering to them.

Example 1

250 parts by weight commercial tungstic acid are slowly introduced into 800 parts of a 10% boiling caustic soda solution. After cooling down the solution is filtered and the filtrate is allowed to drip slowly under stirring into 925 parts of a 15% nitric acid. After stirring further during some time the precipitate is allowed to settle down and after decantation of the supernatant liquid is filtered by suction. This precipitate is now stirred for a longer period with 2500 parts of a 1% nitric acid heated almost to boiling point, whereafter it is separated again from the acid. This stirring and separating with a nitric acid of 1% is repeated five times in the same manner. Finally the filtered precipitate is dried at 130° C., thereafter ground and sifted.

Other catalysts are treated in an analogous manner.

Instead of the acids, their anhydrids may be used.

Example 2

Ammonium tungstate is heated in a current of superheated steam to about 290–300° C.

Example 3

Tungstic acid or tungstic acid anhydrid are dissolved in hot ammonia solution of 4–8% and the filtered solution is concentrated on the water bath, the residue being heated to 290–300° C. in a current of steam heated to the same temperature, until the percentage of ammonia in the residue has dropped to 1.7–1.0%. Two parts of the product thus obtained are intimately mixed with one part water and the mixture is heated during 16 hours at 240° C. in an autoclave, i. e. under pressure, filtered by suction and dried at 120° C.

Example 4

Ammonium vanadate is heated to 320–325° C. in a current of steam heated to the same temperature, until almost all the ammonia in the product has been split off. One part of this product is now intimately mixed with two parts water and heated 16 hours in an autoclave (under pressure) at 240° C., whereupon the product is filtered by suction and dried at 110° C.

Example 5

Ammonium molybdate is heated to 300–310° C. in a current of steam heated to the same temperature until almost all the ammonia in the product has been split off. One part of this product is now intimately mixed with two parts water and heated 16 hours in an autoclave (under pressure) to 250° C. The product is now filtered and the residue dried at about 110° C.

Example 6

120 grams ammonium tungstate are suspended in 50 ccms. water and after adding 296 ccms. normal hydrochloric acid the suspension is heated nine hours under stirring on the boiling water bath. The suspension is then filtered by suction and the residue dried. The tungstic acid thus obtained contains 1.5% ammonia.

Example 7

Ammonium tungstate is heated in a current of superheated steam to 290–300° C. until the percentage of ammonia has been reduced to 1.7–1.3%.

Example 8

Ammonium molybdate is heated to 280° C. in current of superheated steam until the product contains about 3% ammonia.

Example 9

Ammonium vanadate is heated to 400° C. in a current of superheated steam until the product contains 0.5–1% ammonia.

Example 10

A solution of 150 parts tungstic acid in 150 parts of an ammonia solution of 25% and 300 parts water is allowed to drip at 100° C. into 237 parts nitric acid (spec. gr. 1.4). After heating for another half hour the solution is filtered by suction, the residue is rinsed and dried at 100° C. The tungstic acid thus obtained contains 0.85% ammonia.

Example 11

30 parts tungstic acid are dissolved in the calculated quantity of caustic soda solution. Into this solution a mixture of 100 parts hydrochloric acid of 25% and 50 parts water is allowed to drip under stirring. The solution is filtered by suction, the residue washed out and dried at 100° C. The preparation thus obtained contains 0.3% sodium.

Example 12

Tungstic acid or tungstic acid anhydrid is stirred mechanically in a moist atmosphere containing 25% ammonia until no further increase of weight is noticed. The tungstate thus obtained is now heated and part of the ammonia escapes already at low temperature. The preparation is now heated in a current of superheated steam to about 290° C. and thereafter treated with water in an autoclave at 240° C., whereupon the water is removed by evaporating to dryness.

After incomplete expulsion of the ammonia a preparation containing 1.7–1.3% ammonia is obtained.

Example 13

100 parts sodium phosphoro-tungstate (prepared according to Kehrmann, "Berichte der Deutschen Chem. Ges." 24, (1891), p. 2326) are dissolved in 500 parts water and to the solution is added a solution of 50 parts phosphoro-tungstic acid in 200 parts water. After evaporation of the mixture on the water bath the residue is dried a short time at 110–120° C.

Example 14

A commercial solution of sodium silicate (water-glass) is diluted with two parts water and concentrated hydrochloric acid (spec. gr. 1.19) is added drop by drop under vigorous stirring until phenolphthaleine is discolored, while litmus paper does not yet turn red. The precipitate is well rinsed, filtered by suction and dried in vacuo at 100° C.

*Example 15*

In commercial sodium titanate the total alkalinity is ascertained by titration with normal hydrochloric acid, methyl orange being used as indicator. The sodium titanate is now suspended in water and treated in the cold with 95% of the theoretically required quantity of glacial acetic acid. After two hours stirring the titanic acid is filtered by suction and dried in vacuo at 100° C.

*Example 16*

To a solution of 232 grams pure phosphoric acid in two litres water 124 grams finely powdered boric acid are added and the solution is now concentrated by evaporation until it gets turbid and further until solidification ensues. The solid mass is heated 8 hours to 310-340° C. and ground after cooling. It is then dissolved in ammonia of about 20% and the solution concentrated on the water bath. The residue is ground again and steam of 340-345° C. is conducted at the same temperature in contact with the residue to expel the ammonia. The residue from this treatment is heated some time with water in an autoclave (under pressure) to 240° C. and then evaporated to dryness.

Various changes may be made in the details disclosed in the foregoing specification without departing from the invention or sacrificing the advantages thereof.

We claim:—

1. The method of preparing catalysts adapted for use in the conversion of terpenes comprising acting with a base on a compound belonging to the group of compounds constituted by inorganic acids, inorganic complex acids, inorganic-organic complex acids which combine with terpenes, if at all, only reluctantly, the anhydrids and the salts of such acids which have an acid reaction, to convert such compound into the corresponding salt, removing the base again from such salt, and converting the product thus obtained into the hydrate having the highest catalytic efficiency.

2. The method of preparing catalysts adapted for use in the conversion of terpenes comprising dissolving a compound of the group of compounds constituted by inorganic acids, inorganic complex acids, inorganic-organic complex acids which combine with terpenes, if at all, only reluctantly, the anhydrids and the salts of such acids, which have an acid reaction, in the solution of a base, precipitating such compound from this solution, and converting the product thus obtained into the hydrate having the highest catalytic efficiency.

3. The method of preparing catalysts adapted for use in the conversion of terpenes, comprising dissolving a compound of the group of compounds constituted by inorganic acids, inorganic complex acids, inorganic-organic complex acids which combine with terpenes, if at all, only reluctantly, the anhydrids and the salts of such acids, which have an acid reaction, in the solution of a base, precipitating such compound from this solution, drying the precipitate and converting the product thus obtained into the hydrate having the highest catalytic efficiency.

4. The method of preparing catalysts adapted for use in the conversion of terpenes comprising converting a compound of the group of compounds constituted by inorganic acids, inorganic complex acids, inorganic-organic complex acids which combine with terpenes, if at all, only reluctantly, the anhydrids and the salts of such acids, which have an acid reaction, into a salt of a volatile base, expelling this base at a temperature above normal by applying heat and converting the product thus obtained into the hydrate having the highest catalytic efficiency.

5. The method of preparing catalysts adapted for use in the conversion of terpenes comprising converting a compound of the group of compounds constituted by inorganic acids, inorganic complex acids, inorganic-organic complex acids which combine with terpenes, if at all, only reluctantly, the anhydrids and the salts of such acids, which have an acid reaction, into a salt of a volatile base and expelling this base at a temperature above normal by acting thereon with steam.

6. The method of preparing catalysts adapted for use in the conversion of terpenes comprising converting a compound of the group of compounds constituted by inorganic acids, inorganic complex acids, inorganic-organic complex acids which combine with terpenes, if at all, only reluctantly, the anhydrids and the salts of such acids, which have an acid reaction, into a salt of a volatile base and expelling this base at a temperature above normal by acting thereon with superheated steam.

7. The method of preparing catalysts adapted for use in the conversion of terpenes comprising converting a compound of the group of compounds constituted by inorganic acids, inorganic complex acids, inorganic-organic complex acids which combine with terpenes, if at all, only reluctantly, the anhydrids and the salts of such acids, which have an acid reaction, into a salt of a volatile base, expelling this base at a temperature above normal by applying heat and heating the residue with water under a pressure above normal.

8. The method of preparing catalysts adapted for use in the conversion of terpenes comprising converting a compound of the group of compounds constituted by inorganic acids, inorganic complex acids, inorganic-organic complex acids, which combine with terpenes, if at all, only reluctantly, the anhydrids and the salts of such acids, which have an acid reaction, into a salt of a volatile base, expelling this base at a temperature above normal by acting thereon with steam and heating the residue with water under a pressure above normal.

9. The method of preparing catalysts adapted for use in the conversion of terpenes comprising converting a compound of the group of compounds constituted by inorganic acids, inorganic complex acids, inorganic-organic complex acids which combine with terpenes, if at all, only reluctantly, the anhydrids and the salts of such acids, which have an acid reaction, into a salt of a volatile base, expelling this base at a temperature above normal by acting thereon with superheated steam and heating the residue with water under a pressure above normal.

10. The method of preparing catalysts adapted for use in the conversion of terpenes comprising converting a compound of the group of compounds constituted by inorganic acids, inorganic complex acids, inorganic-organic complex acids which combine with terpenes, if at all, only reluctantly, the anhydrids and the salts of such acids, which have an acid reaction, into a salt of a volatile base, expelling this base at a temperature above normal by applying heat and heating the residue with water under a pressure above normal in the presence of a small quantity of a base.

11. The method of preparing catalysts adapted for use in the conversion of terpenes comprising converting a compound of the group of compounds constituted by inorganic acids, inorganic complex acids, inorganic-organic complex acids which combine with terpenes, if at all, only reluctantly, the anhydrids and the salts of such acids, which have an acid reaction, into a salt of a volatile base, expelling this base at a temperature above normal by acting thereon with steam and heating the residue with water under a pressure above normal in the presence of a small quantity of a base.

12. The method of preparing catalysts adapted for use in the conversion of terpenes comprising converting a compound of the group of compounds constituted by inorganic acids, inorganic complex acids, inorganic-organic complex acids which combine with terpenes, if at all, only reluctantly, the anhydrids and the salts of such acids, which have an acid reaction, into a salt of a volatile base, expelling this base at a temperature above normal by acting thereon with superheated steam and heating the residue with water under a pressure above normal in the presence of a small quantity of a base.

13. The method of preparing catalysts adapted for use in the conversion of terpenes comprising acting with a base on a compound belonging to the group of compounds constituted by inorganic acids, inorganic complex acids, inorganic-organic complex acids which combine with terpenes, if at all, only reluctantly, the anhydrids and the salts of such acids which have an acid reaction, to convert such compound into the corresponding salt, incompletely removing the base from such salt and converting the product thus obtained into the hydrate having the highest catalytic efficiency.

14. The method of preparing catalysts adapted for use in the conversion of terpenes comprising acting with a base on a compound belonging to a group of compounds constituted by inorganic acids, inorganic complex acids, inorganic-organic complex acids which combine with terpenes, if at all, only reluctantly, the anhydrids and the salts of such acids, which have an acid reaction, to convert such compound into the corresponding salt, treating such salt with a quantity of an acid which suffices to remove most, but not all, of the base and converting the product thus obtained into the hydrate having the highest catalytic efficiency.

15. The method of preparing catalysts adapted for use in the conversion of terpenes comprising acting on a compound of the group of compounds constituted by inorganic acids, inorganic complex acids, inorganic-organic complex acids which combine with terpenes, if at all, only reluctantly, the anhydrids and the salts of such acids, which have an acid reaction, with a volatile base to produce the corresponding salt and incompletely expelling the base from this salt by heating in a current of steam.

16. The method of preparing catalysts adapted for use in the conversion of terpenes comprising acting on a compound of the group of compounds constituted by inorganic acids, inorganic complex acids, inorganic-organic complex acids which combine with terpenes, if at all, only reluctantly, the anhydrids and the salts of such acids, which have an acid reaction, with a volatile base to produce the corresponding salt and incompletely expelling the base from this salt by heating in a current of superheated steam.

17. The method of preparing catalysts adapted for use in the conversion of terpenes comprising acting with a base on a compound belonging to the group of compounds constituted by inorganic acids, inorganic complex acids, inorganic-organic complex acids which combine with terpenes, if at all, only reluctantly, the anhydrids and the salts of such acids which have an acid reaction, to convert such compound into the corresponding salt, completely removing the base from such salt and treating the residue with water at a temperature above normal to convert the product thus obtained into the hydrates having the highest catalytic efficiency.

18. The method of preparing catalysts adapted for use in the conversion of terpenes comprising acting with a base on a compound belonging to a group of compounds constituted by inorganic acids, inorganic complex acids, inorganic-organic complex acids which combine with terpenes, if at all, only reluctantly, the anhydrids and the salts of such acids, which have an acid reaction, to convert such compound into the corresponding salt, treating such salt with a quantity of an acid which suffices to remove most, but not all, of the base and treating the residue with water at a temperature above normal to convert the product thus obtained into the hydrates having the highest catalytic efficiency.

19. The method of preparing catalysts adapted for use in the conversion of terpenes comprising acting on a compound of the group of compounds constituted by inorganic acids, inorganic complex acids, inorganic-organic complex acids which combine with terpenes, if at all, only reluctantly, the anhydrids and the salts of such acids, which have an acid reaction, with a volatile base to produce the corresponding salt, incompletely expelling the base from this salt by heating in a current of steam and treating the residue with water at a temperature above normal.

20. The method of preparing catalysts adapted for use in the conversion of terpenes comprising acting on a compound of the group of compounds constituted by inorganic acids, inorganic complex acids, inorganic-organic complex acids which combine with terpenes, if at all, only reluctantly, the anhydrids and the salts of such acids, which have an acid reaction, with a volatile base to produce the corresponding salt, incompletely expelling the base from this salt by heating in a current of superheated steam and treating the residue with water at a temperature above normal.

21. The method of preparing catalysts adapted for use in the conversion of terpenes comprising acting with a base on a compound belonging to the group of compounds constituted by inorganic acids, inorganic complex acids, inorganic-organic complex acids which combine with terpenes, if at all, only reluctantly, the anhydrids and the salts of such acids which have an acid reaction, to convert such compound into the corresponding salt, incompletely removing the base from such salt and treating the residue with water at a temperature and under a pressure above normal.

22. The method of preparing catalysts adapted for use in the conversion of terpenes comprising acting with a base on a compound belonging to a group of compounds constituted by inorganic acids, inorganic complex acids, inorganic-organic complex acids which combine with terpenes, if at all, only reluctantly, the anhydrids and the salts of such acids, which have an acid reaction, to convert such compound into the corresponding salt, treating such salt with a quantity of an acid which suffices to remove most, but not all, of the base and treating the residue with water at a temperature and under a pressure above normal.

23. The method of preparing catalysts adapted for use in the conversion of terpenes comprising acting on a compound of the group of compounds constituted by inorganic acids, inorganic complex acids, inorganic-organic complex acids which combine with terpenes, if at all, only reluctantly, the anhydrids and the salts of such acids, which have an acid reaction, with a volatile base to produce the corresponding salt, incompletely expelling the base from this salt by heating in a current of steam and treating the residue with water at a temperature and under pressure above normal.

24. The method of preparing catalysts adapted for use in the conversion of terpenes comprising acting on a compound of the group of compounds constituted by inorganic acids, inorganic complex acids, inorganic-organic complex acids which combine with terpenes, if at all, only reluctantly, the anhydrids and the salts of such acids, which have an acid reaction, with a volatile base to produce the corresponding salt, incompletely expelling the base from this salt by heating in a current of superheated steam and treating the residue with water at a temperature and under pressure above normal.

25. The method of preparing catalysts adapted for use in the conversion of terpenes comprising allowing a tungstic acid compound belonging to the group constituted by tungstic acid and tungstic acid anhydrid to be acted upon by moist ammonia gas until no further increase of weight occurs and expelling the ammonia from the salt thus formed.

26. The method of preparing catalysts adapted for use in the conversion of terpenes comprising allowing a tungstic acid compound belonging to the group constituted by tungstic acid and tungstic acid anhydrid to be acted upon by moist ammonia gas until no further increase of weight occurs and incompletely expelling the ammonia from the salt thus formed.

HANS MEERWEIN.
FRITZ ULFFERS.
RUDOLF ERBE.
FRANZ AICHNER.
WOLFGANG KLAPHAKE.